United States Patent [19]

Akashi

[11] Patent Number: 4,952,963

[45] Date of Patent: Aug. 28, 1990

[54] FOCUS DETECTION APPARATUS FOR CAMERA

[75] Inventor: Akira Akashi, Yokohama, Japan

[73] Assignee: Canon Kabushiki Kaisha, Tokyo, Japan

[21] Appl. No.: 399,404

[22] Filed: Aug. 25, 1989

Related U.S. Application Data

[63] Continuation of Ser. No. 134,856, Dec. 18, 1987, abandoned.

[30] Foreign Application Priority Data

Jan. 12, 1987 [JP] Japan ............................. 62-004565
Jan. 12, 1987 [JP] Japan ............................. 62-004568

[51] Int. Cl.$^5$ ........................... G03B 3/00; G01J 1/20
[52] U.S. Cl. ..................................... 354/402; 354/406; 250/201.2
[58] Field of Search ............... 354/402, 403, 406, 407, 354/408; 250/201, 201 PF, 201 AF, 204, 201.2, 201.5, 201.7, 201.8

[56] References Cited

U.S. PATENT DOCUMENTS

| 4,346,970 | 8/1982 | Kawabata et al. | 354/25 |
| 4,475,800 | 10/1984 | Kinoshita et al. | 354/406 |
| 4,523,829 | 6/1985 | Eguchi et al. | 354/406 |
| 4,633,073 | 12/1986 | Horikawa | 354/403 X |
| 4,716,434 | 12/1987 | Taniguchi et al. | 250/201 X |

FOREIGN PATENT DOCUMENTS

2838647 4/1980 Fed. Rep. of Germany.
3141959 6/1982 Fed. Rep. of Germany.
2030417 4/1980 United Kingdom.

*Primary Examiner*—W. B. Perkey
*Attorney, Agent, or Firm*—Fitzpatrick, Cella, Harper & Scinto

[57] ABSTRACT

A focus detection apparatus including an image signal storage type sensor having a plurality of pixels and a storage time control circuit for controlling an intensity level of the sensor, wherein the storage time of an image signal in the sensor is controlled such that the image signal has an optimal level, and focus detection is performed on the basis of the image signal whose storage time is controlled. A pixel output range used for focus detection and a sensor area used for storage time control are changed on the basis of the focus detection result.

19 Claims, 11 Drawing Sheets

CENTER PORTION AGC RANGE

TOTAL AGC RANGE

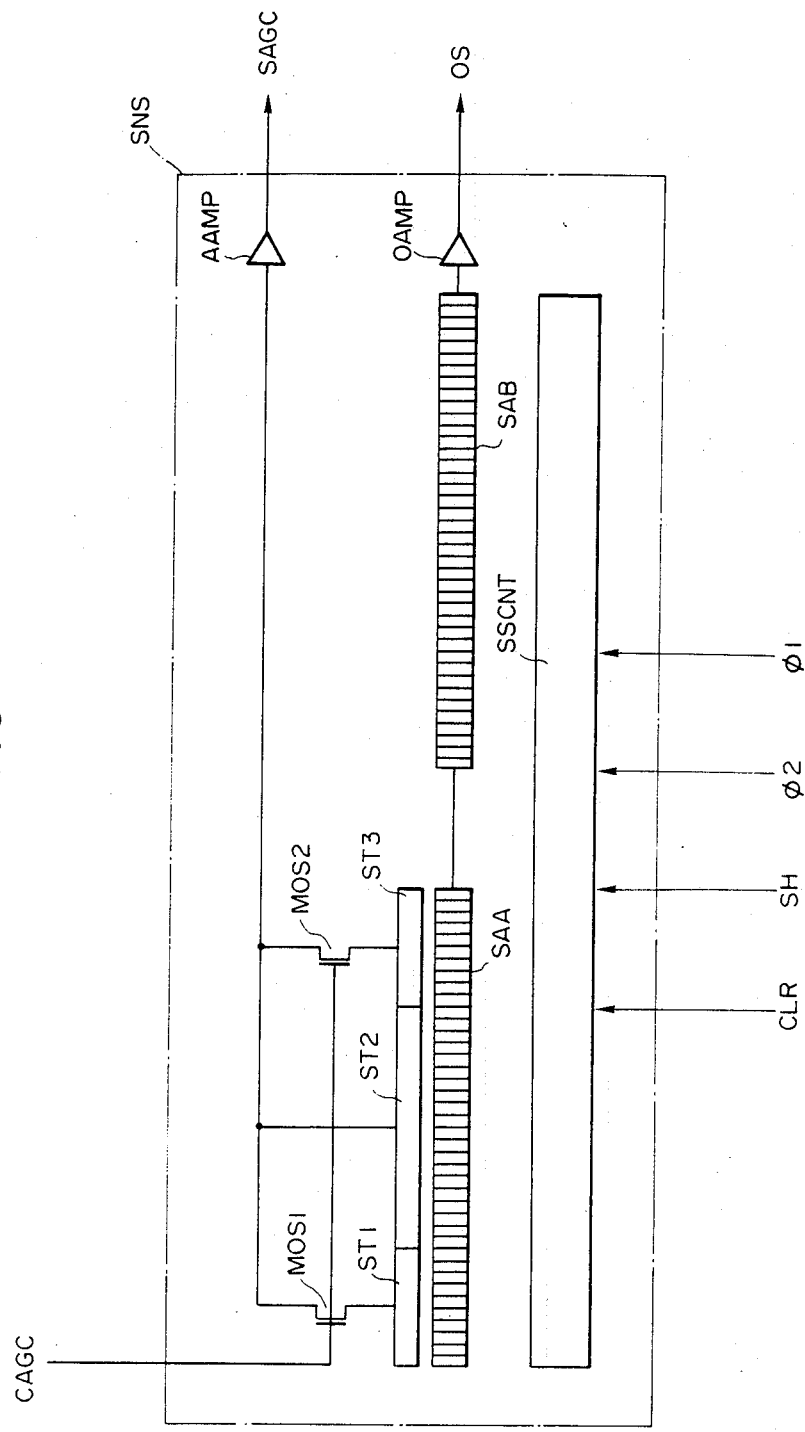

FIG. 7A
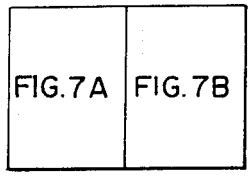
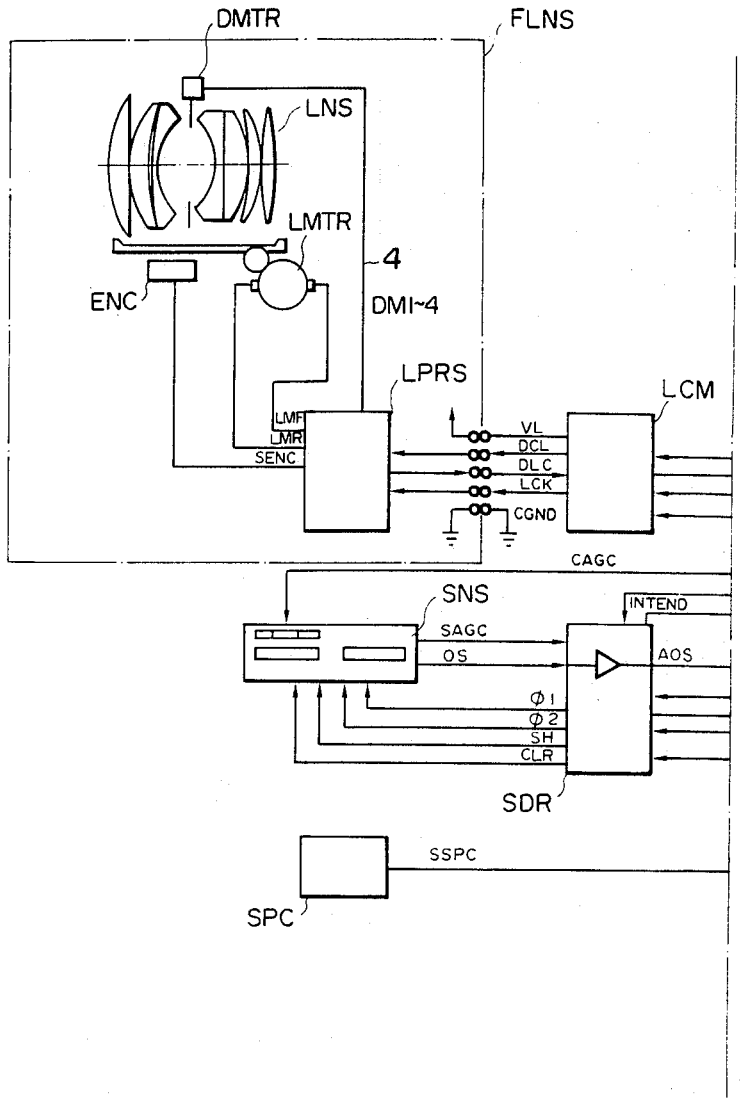

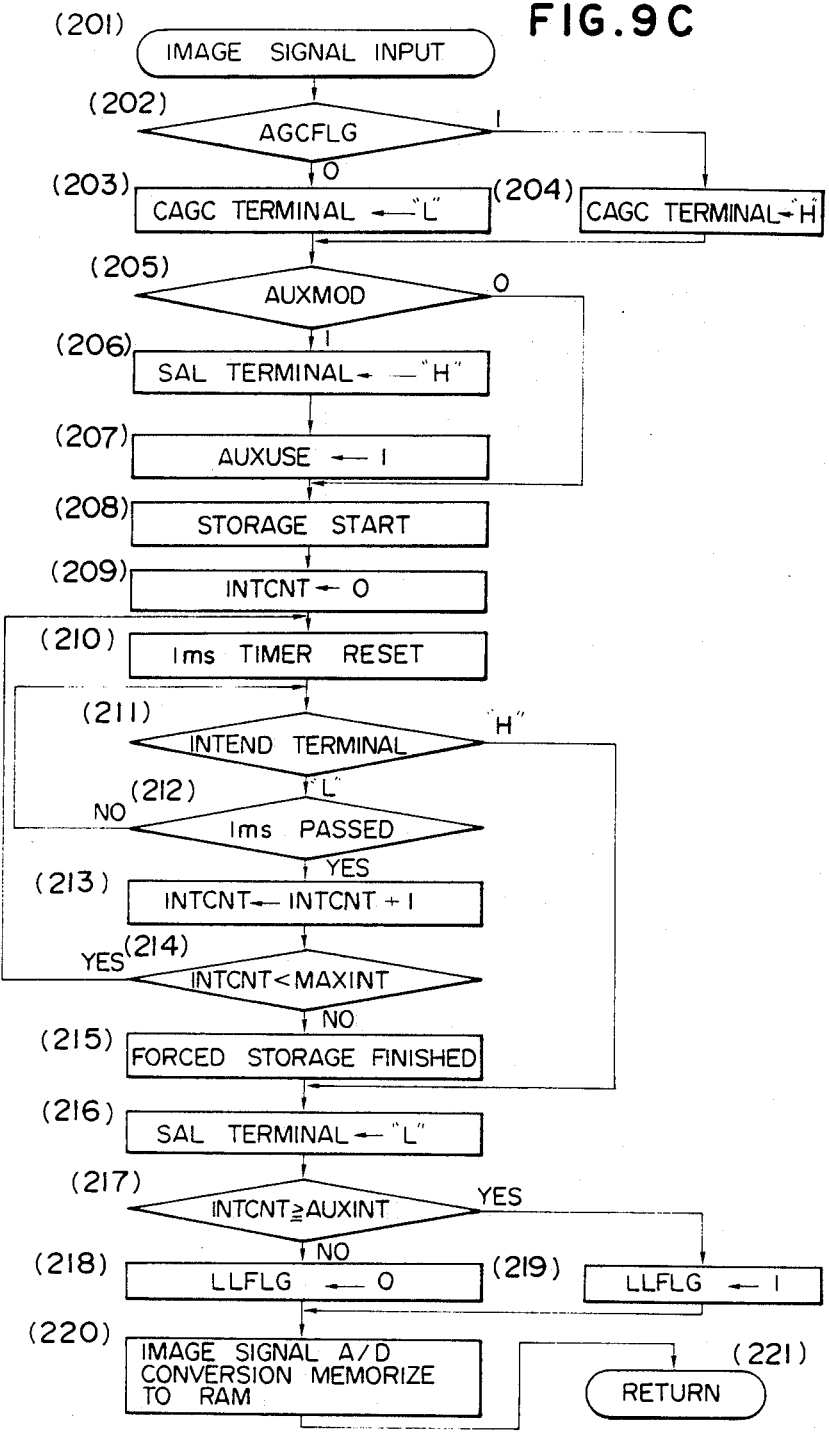

FOCUS DETECTION APPARATUS FOR CAMERA

This application is a continuation of application Ser. No. 134,856, filed Dec. 18, 1987, now abandoned.

BACKGROUND OF THE INVENTION

1. Field of the Invention

The present invention relates to a focus detection apparatus for a camera.

2. Related Background Art

In a typical conventional focus detection apparatus for a camera, an exit pupil of a photographing lens is divided into a plurality of areas, and relative position displacements in a plurality of images formed by beams passing through the respective pupil areas are measured to detect a focus state of the photographing lens.

More specifically, the exit pupil of the photographing lens is divided into halves by a focus detection optical system. The beams passing through the divided pupil areas are focused to form images on storage type photoelectric transducer element arrays (e.g., CCD sensor arrays). Sensor output signals are A/D-converted, and the digital signal obtained for the one or both of the areas are extracted. The extracted signals are processed to detect a relative position displacement between the two images.

In a focus state detection method of the type described above, the relative position displacement between the two images is not detected on the basis of the outputs from all pixels constituting the sensor array but is detected by shifting a pixel range of interest with all or some pixels. The factor for pixel range shifting is a focal length of the photographing lens, and optimal focus detection is performed on the basis of the focal length.

The field of view for distance measurement exists in the center portion of the sensor array and the pixel range of the sensor which corresponds to the field of view for distance measurement is located at the center portion of the sensor array. It is preferable to perform focus detection on the basis of an output from the sensor pixel range corresponding to the center portion. However, a defocus detection ability in the pixel range of the center portion is small as compared with a case wherein all pixels of the sensor array are used. Accordingly, a focus detection disable state may be caused when focus detection is performed using the pixel range of the center portion. It is therefore preferable to perform focus detection by increasing the pixel range. Pixel range shifting on the basis of the focal length cannot solve the above problem.

SUMMARY OF THE INVENTION

One object of the application is achieved in consideration of the above situation and is to provide a focus detection apparatus, wherein when a distance measurement disable state is caused as a result of focus detection by using pixels falling within a specific range of a sensor array, the pixel range can be changed to perform focus detection again, thereby solving the above problem.

Another object of the application is to provide a focus detection apparatus wherein a monitor sensor area for outputting a signal for performing storage time control of images on the sensor array in synchronism with pixel range shifting coincides with the switched pixel range, thereby performing optimal storage time control even if the pixel range is shifted.

Still another object of the application is to provide a focus detection apparatus wherein a defocus detection capacity of pixels within a given range is compared with a maximum defocus amount on the basis of the above object and the pixel range is widened when the maximum defocus amount in the given range is larger than the defocus detection capacity, thereby solving the problem described above.

The above and other objects, features and advantages of the present invention will be apparent from the following detailed description of a preferred embodiment in conjunction with the accompanying drawings.

BRIEF DESCRIPTION OF THE DRAWINGS

FIG. 6 is a circuit diagram showning arrangement of a sensor unit used in the present invention;

FIGS. 9A to 9F are flow charts for explaining the operations of the present invention.

DESCRIPTION OF THE PREFERRED EMBODIMENT

The principle of focus detection of the present invention will be described with reference to FIG. 1. A photographing lens LNS subjected to focus detection has a common optical axis with a field lens FLD. Two secondary focusing lenses FCLA and FCLB are located symmetrical with respect to the optical axis behind the field lens FLD. Sensors SAA and SAB are located behind the secondary focusing lenses FCLA and FCLB. Diaphragms DIA and DIB are located near the secondary focusing lenses FCLA and FCLB. The field lens FLD is arranged such that an exit pupil of the photographing lens LNS is focused on pupil surfaces of the secondary focusing lenses FCLA and FCLB. Beams incident on the secondary focusing lenses FCLA and FCLB are output from areas of the photographing lens LNS which correspond to the secondary focusing lenses FCLA and FCLB so as not to overlap each other and have the same size. When an image formed near the field lens FLD is focused again on the surfaces of the sensor arrays SAA and SAB by the secondary focusing lenses FCLA and FCLB, the positions of the images on the sensor arrays SAA and SAB are changed on the basis of the displacement of the image position along the optical axis. Therefore, when a displacement (deviation) between the positions of the two images on the sensor arrays is detected, a focus state of the photographing lens I,NS can be detected.

Figure 2:
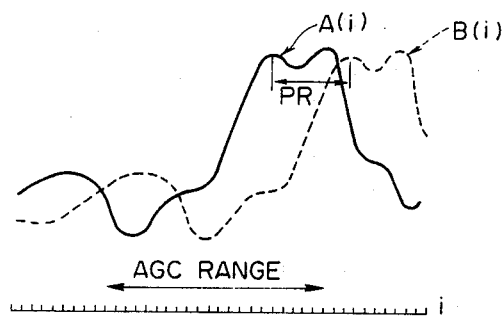
FIGS. 2, 3, 4, and 5 are waveform charts showing states of photoelect transducer outputs from sensors SAA and SAB shown in FIG. 1.

FIG. 2 shows photoelectric transducer outputs of the two images formed on the sensor arrays SAA and SAB. The output from the sensor array SAA is defined as A(i) (where i=0,... 39), and the output from the sensor array SAB is defined as B(i). In this case, the number of pixels of the sensor is 40.

An image deviation PR from the image signals A(i) and B(i) is processed by a technique disclosed in Japanese Laid-Open Patent Application No. 142306/1983, 107313/1984, or 1015313/1985, or Japanese Patent Application No. 160824/1986 filed by the present applicant.

Figure 3:
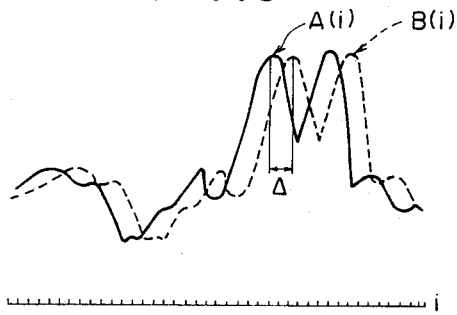

Focus control of the photographing lens is performed on the basis of the image deviation calculated by the techniques disclosed in the prior art applications described above, and the relationship between the two images in the in-focus state is shown in FIG. 3. In this case, a deviation $\Delta$ is present between the two images. In other words, this deviation is one between optical images formed on the two sensor arrays in the in-focus state after the secondary focusing optical system shown in FIG. 1 is adjusted. The deviation $\Delta$ is stored in a nonvolatile memory in a processor. When a value obtained by subtracting the deviation $\Delta$ from the detected deviation PR falls within a predetermined range, the processor determines that an in-focus state is obtained.

Figure 4:
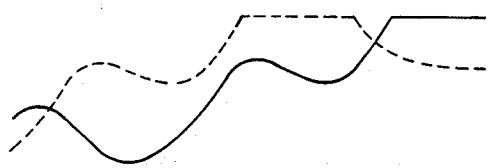
Figure 5:
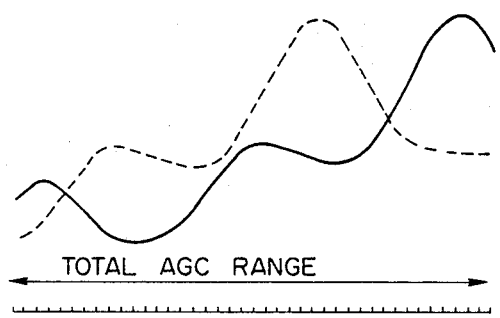

The photoelectric transducer signals shown in FIGS. 2 and 3 are obtained when AGC (Auto Gain Control) is effective in the range of the center portion of the sensor array SAA (to be referred to as a center portion AGC hereinafter). Sensor storage operation is controlled by a luminance of an optimal image formed on pixels within the "AGC range" so as not to saturate the photoelectric transducer signal within the AGC range. The signals shown in FIGS. 2 and 3 are optimal outputs since their maximum levels fall within the center portion AGC range. However, as shown in FIG. 4, when the maximum value of the signal output falls outside the center portion AGC range, the signal is electrically saturated regardless of the optimal output within the AGC range. When signal processing for image deviation is performed using this image signal, an image deviation error is detected due to the influence of the saturated portion. In this case, the AGC range is widened to the entire area of the sensor array (to be referred to as a total AGC range hereinafter). Therefore, an optimal photoelectric transducer signal shown in FIG. 5 can be obtained.

An arrangement of a line sensor unit SNS whose AGC range can be changed is shown in FIG. 6.

Figure 1:
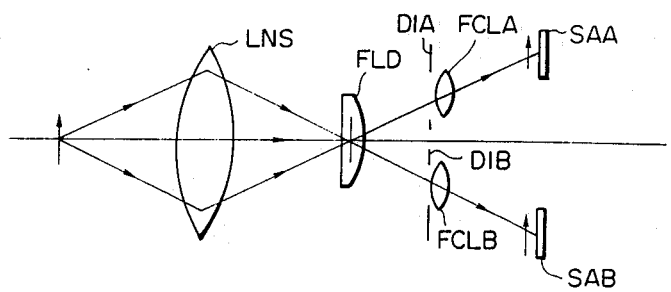
FIG. 1 is a view for explaining the principle of focus detection according to the present invention.

The sensor arrays SAA and SAB are known CCD line sensors which correspond to the sensor arrays shown in FIG. 1. Clocks $\phi 1$ and $\phi 2$ are used to drive the CCD line sensors SAA and SAB. A signal SH is used to transfer the charge stored in the photoelectric transducer element to the CCD section (i.e., a charge transfer section) when the signal SH is set at a high potential (to be referred to as an "H" level hereinafter; the low potential is referred to as an "L" level) for a predetermined period of time. A clear signal CLR of "H" level is used to discharge the photoelectric transducer element. A control circuit SSCNT in the SNS receives the signals $\phi 1$, $\phi 2$, SH, and CLR and controls the photoelectric transducer elements and the CCD section. Photoelectric transducer outputs of the images formed on the sensor arrays SAA and SAB are output as a serial signal OS through an amplifier OAMP in response to the signals $\phi 1$ and $\phi 2$.

AGC light measuring elements STI, ST2, and ST3 comprise photodiodes. Outputs from the light measuring elements STI, ST2, and ST3 are output as a signal SAGC through an amplifier AAMP. An image formed on the sensor array SAA is also formed on the light measuring elements STI, ST2, and ST3, so that the same image as that formed on the sensor array SAA is used for AGC control. MOS transistors MOSI and MOS2 serve to switch the outputs from the light measuring elements ST1 and ST2. When the signal CAGC is set at "H" level, the MOS transistors MOSI and MOS2 are turned on, and a signal SAGC is a sum of the outputs from the light measuring elements ST1, ST2, ahd ST3. When the signal CAGC is set at "L" level, the MOS transistors MOSI and MOS2 are turned off, and the signal SAGC represents only the output from the central light measuring element ST2. Therefore, when the signal CAGC is set at "H" level, the total AGC range is set; and when the signal CAGC is set at "L" level, the center portion AGC range is set.

A detailed tech-=ique for AGC control will be described later with reference to flow charts.

Figure 7B:
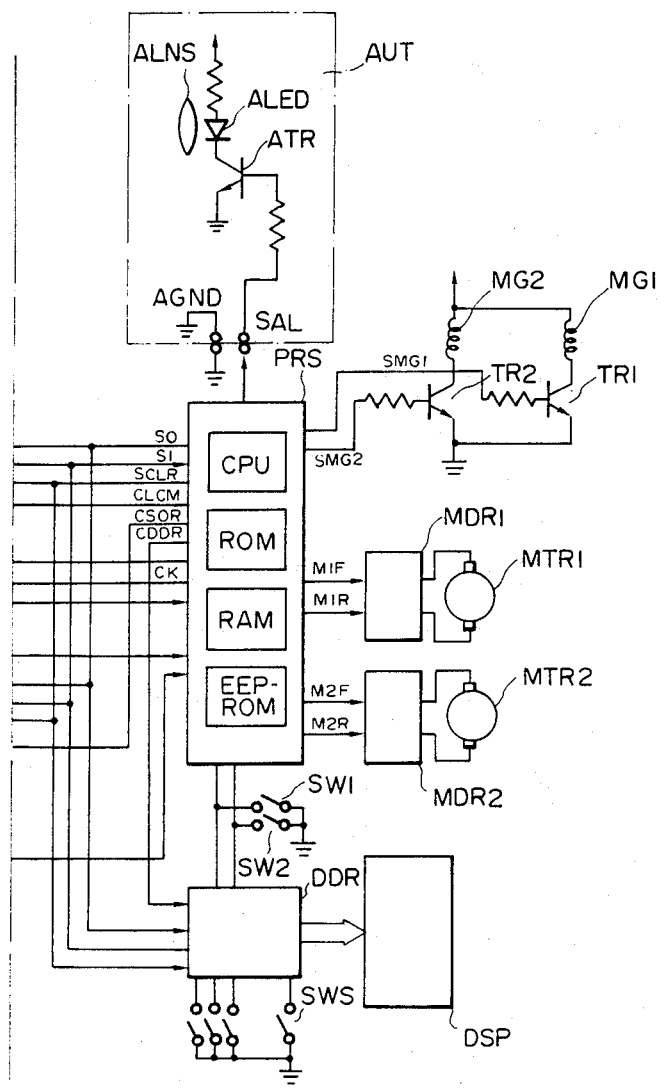
FIG. 7, comprising FIGS. 7A and 7B, and shows is a circuit diagram of a camera with a focus detection apparatus according to an embodiment of the present invention.

FIG. 7 is a circuit diagram of a camera with an automatic focusing a-paratus according to the present invention.

Referring to FIG. 7, a controller for a camera comprises a one-chip microcomputer PRS having a CPU (Central Processing Unit), a ROM, a RAM, and an EEPROM (Electrically Erasable Programmable Read-Only memory). The computer PRS has an A/D conversion function. The computer PRS performs automatic exposure (AE) control, automatic focus (AF) detection, and film winging and rewinding in accordance with the sequence programs stored in the ROM. The EEPROM is a nonvolatile memory for storing the deviation data $\Delta$ described above and other control data.

The computer PRS communicates with peripheral circuits and lenses to control the respective circuits and lenses in accordance with communication signals SO, SI, and SCLK.

The signal SO is a data signal output from the computer PRS. The signal SI is a data signal input to the computer PRS. The signal SCLK is a synchronizing signal for the signals SO and SI.

A lens communication buffer circuit LCM supplies a lens drive voltage V to the lens during the operation of the camera. When the signal CLCM from the computer PRS is set at "H" level, the buffer LCM serves as a communication buffer between the camera and the lens.

When the computer PRS sets the signal CLCM at "H" level and sends predetermined data SO in synchronism with the signal SCLK, the buffer LCM sends buffer signals LCK and DCL lo the lens through the camera-lens contacts in response to the signals SCLK and SO. At the same time, the lens outputs a buffer signal SI in response to the signal DLC and the computer PRS receives the signal SI in response to the signal SCLK. In this manner, the computer PRS receives data.

A driving circuit SDR drives a focus detection line sensor unit SNS. When the signal CSDR is set at "H" level, the driver SDR is enabled and is controlled by the computer PRS in response to signals SO, SI, and SCLK.

A signal CK is a clock for generating the CCD drive clocks $\phi 1$ and $\phi 2$. A signal INTEND is used to signal to the computer PRS that the storage operation is completed.

An output signal OS from the line sensor unit SNS is a serial image signal (FIG. 6) synchronized with the clocks $\phi 1$ and $\phi 2$. The signal OS is amplified by an amplifier in the driver SDR, and the amplified signal is supplied as a signal AOS to the computer PRS. The computer PRS received the signal AOS from its analog input terminal and converts it into a digital signal in response to the signal CK in accordance with the A/D conversion function. The converted digital signal is stored at a predetermined address of the RAM.

The signal SAGC as an output signal from the unit SNS is output from the AGC control sensors (ST1 to ST3 in FIG. 6) therein. The signal SAGC is input to the driver SDR and is used for storage control of the line sensor unit SNS. A series of operations of the driver SDR will be described later.

A photometric sensor SPC receives light through the photographing lens and generates an output for exposure control. An output SSPC from the photometric sensor SPC is input to the analog input terminal of the computer PRS and is converted into a digital signal. This digital signal is used for automatic exposure (AE) control.

A driver DDR is used for switch sensing and display. The driver DDR is selected when the signal CDDR is set at "H" level. The driver DDR is controlled by the computer PRS in response to the signals SO, SI, and SCLK. The camera display mode is changed by the driver DDR on the basis of the data sent from the computer PRS. The driver DDR sends on/off states of switches SWS interlocked with various operation members such as a release button (not shown) (interlocked with switches SW1 and SW2; and other mode buttons to the computer PRS.

Drivers MDR1 and MDR2 drive film feed and shutter charge motors MTR1 and MTR2, respectively. The motor MTR1 is driven in the forward direction in response to a signal M1F and in the reverse direction in response to a signal M1R. The motor MTR2 is driven in the forward direction in response to a signal M2F and in the reverse direction in response to a signal M2R.

Shutter front and rear curtain magnets MG1 and MG2 are energized by amplifying transistors TR1 and TR2 in response to signals SMG1 and SMG2, respectively, so that the computer PRS can perform shutter control.

The operations of the drivers DDR, MDR1, and MDR2 are not directly associated with the present invention, and a detailed description thereof will be omitted.

An auxiliary projection unit AUT is mounted on a camera body by a member (not shown). A transistor ATR is turned on in response to a signal SAL from the camera to energize auxiliary light sources LED and ALED. A lens ALNS is used to project light from the auxiliary light source ALED onto the object to be photographed.

A signal DCL input to a lens processor LPRS in synchronism with the sync signal LCK serves as instruction data from the camera to the lens FLNS, and the lens operation represented by the instruction is predetermined.

The lens processor LPRS analyzes the instruction in accordance with predetermined protocols, performs AF and AE control, and outputs various lens parameters (i.e., minimum f-number or full aperture, focal length, and a coefficient of a defocus amount to an extension amount, etc.) from the output DLC.

In the above embodiment, the photographing lens is a single lens which can be integrally extended. When a focus control instruction is sent from the camera, a focus control motor MTR is driven in response to the signals LMF and LMR in accordance with the drive amount and direction signals sent simultaneously with the focus control instruction, and the optical system is moved along the optical axis to perform focus control. A displacement of the optical system is monitored by a pulse signal SENC from an encoder ENC. When predetermined movement of the optical system is completed, the signals LMF and LMR are set at "L" level and the motor LMTR is deenergized.

When the aperture control instruction is sent from the camera, a diaphragm drive stepping motor DMTR is driven in accordance with a diaphragm step signal sent together with the instruction. Since the stepping motor can be controlled by an open loop, an encoder for monitoring its operation need not be used.

The operation of the camera having the arrangement described above will be described with reference to a flow chart of FIG. 9.

When a power switch (not shown) is turned on, the computer PRS is powered and executes the sequence programs stored in the ROM.

Figure 9A:
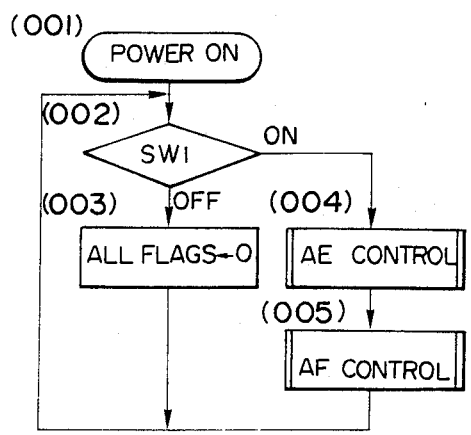

FIG. 9A is a flow chart showing an overall flow of the program.

When the program is started with the above operation, the computer PRS detects a state of the switch SW1 which is turned on with the first stroke of the release button in step (002). If the switch SW1 is detected to be off, all control flags set in the RAM in the computer PRS are cleared in step (003). Detection of the state of the switch SW1 is actually performed as follows. The signal CDDR from the computer PRS is set at "H" level to select the driver DDR, and the signal SO as a detection instruction for the switch SW12 is supplied to the driver DDR so as to allow the driver DDR to detect the state of the switch SW1. The detection result is sent as the signal SI to the computer PRS. The operations in steps (002) and (003) are repeated until the switch SW1 is turned on or the power switch is turned off. When the switch SW1 is turned on, the flow advances to step (004).

Step (004) represents an "AE control" subroutine. In the "AE control" subroutine, photometric processing, exposure control, and a series of camera operations such as shutter charging after exposure and film winding are performed.

The "AE control" subroutine is not essential to the present invention and a detailed description thereof will be omitted. The subroutine function will be briefly described below.

During the ON state of the switch SW1, the "AE control" subroutine is executed to perform mode setting of the camera, photometry, and exposure control calculations and display. When the switch SW2 is turned on with the second stroke of the release button (not shown), the release operation is started by the interrupt function of the computer PRS. The aperture control and shutter speed control are performed on the basis of the exposure value calculated in exposure control calculations. When exposure is completed, shutter charging and film feed operation are performed, and one-frame photographing is executed.

When the "AE control" routine is completed in step (004), an "AF control" subroutine in step (005) is executed.

Figure 9D:
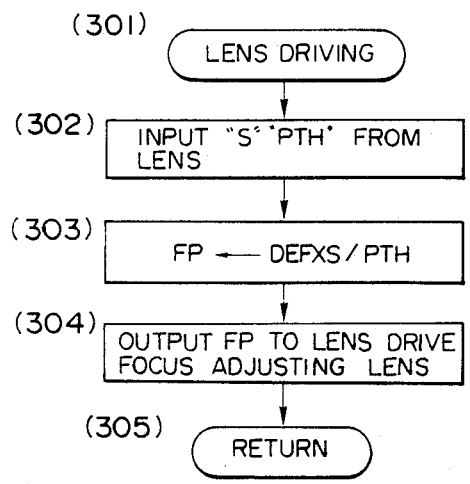
Figure 9B:
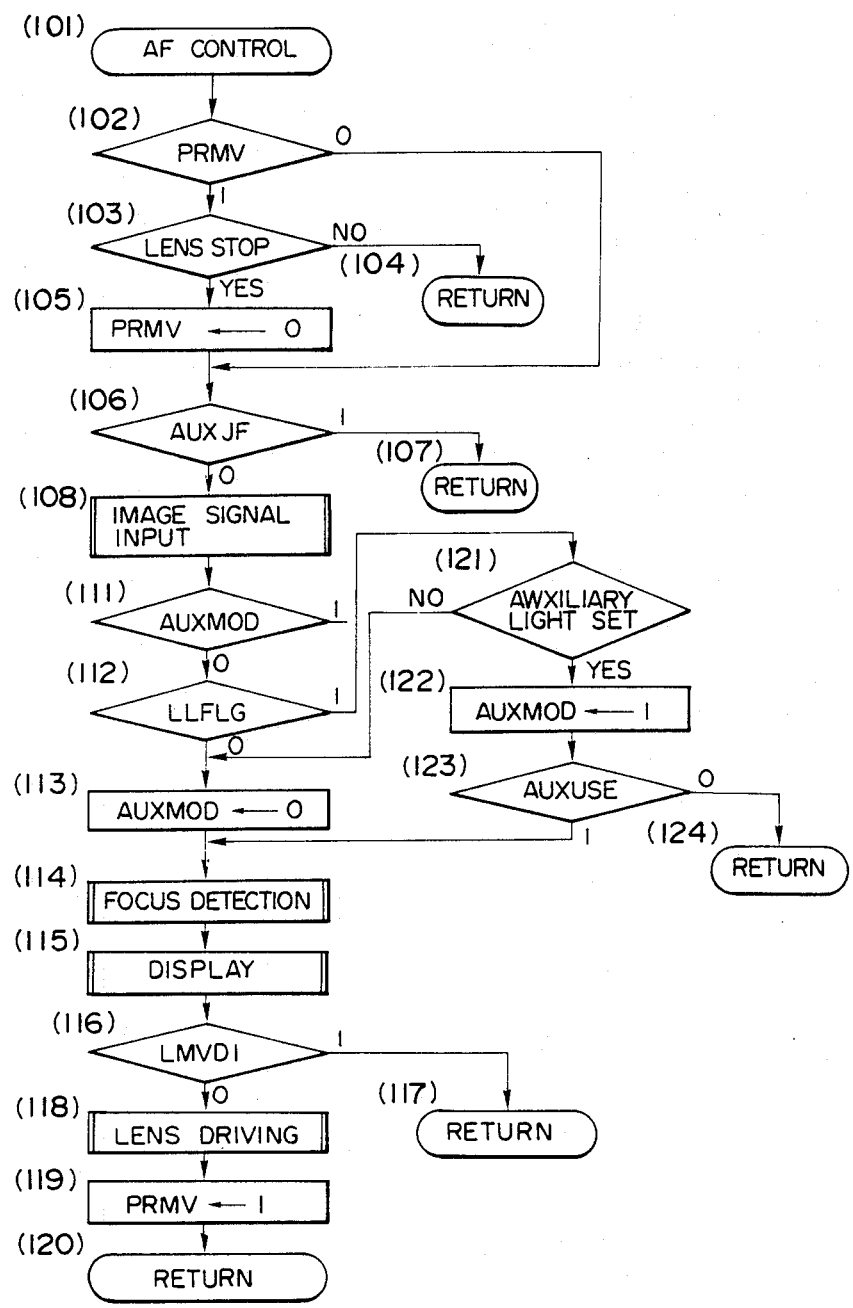

FIG. 9B is a flow chart of the "AF control" subroutine.

The state of a flag PRMV is detected in step (102). The flag PRMV is a flag associated with lens control (to be described later). As described above, during the OFF state of the switch SW1, all flags are reset or cleared. When the "AF control" subroutine in step (005) upon setting of the ON state of the switch SW1 is called, the flag PRMV is set at logic "0" and the flow advances to step (106).

A state of a flag AUXJF is detected in step (106). The flag AUXJF is a flag associated with auxiliary light control. As described above, since the flag AUXJF is set at logic "0", the flow advances to step (108).

Step (108) is an "image signal input" subroutine. When this subroutine is executed, the digital signal of an image signal from the sensor unit SNS is stored at a predetermined address of the RAM in the computer PRS.

FIG. 9C is a flow chart of the "image signal input" subroutine to be described later.

A state of a flag AUXMOD is detected in step (111). The flag AUXMOD represents that the auxiliary light mode is set. Auxiliary light control will be described later.

Since the flag AUXMOD is set at logic "0", the flow advances to step (112). A state of a flag LLFLG is detected in step (112). The flag LLFLG is set in the "image signal input" subroutine in step (108). When the object luminance level is low, the flag LLFLG is set at logic "1". Assume that the object luminance level is sufficiently high, i.e., that the flag LLFLG is set at logic "0". In this state, the flow advances to step (113) and the auxiliary light mode flag AUXMOD is cleared.

A "focus detection" subroutine is executed in step (114).

Figure 9E:
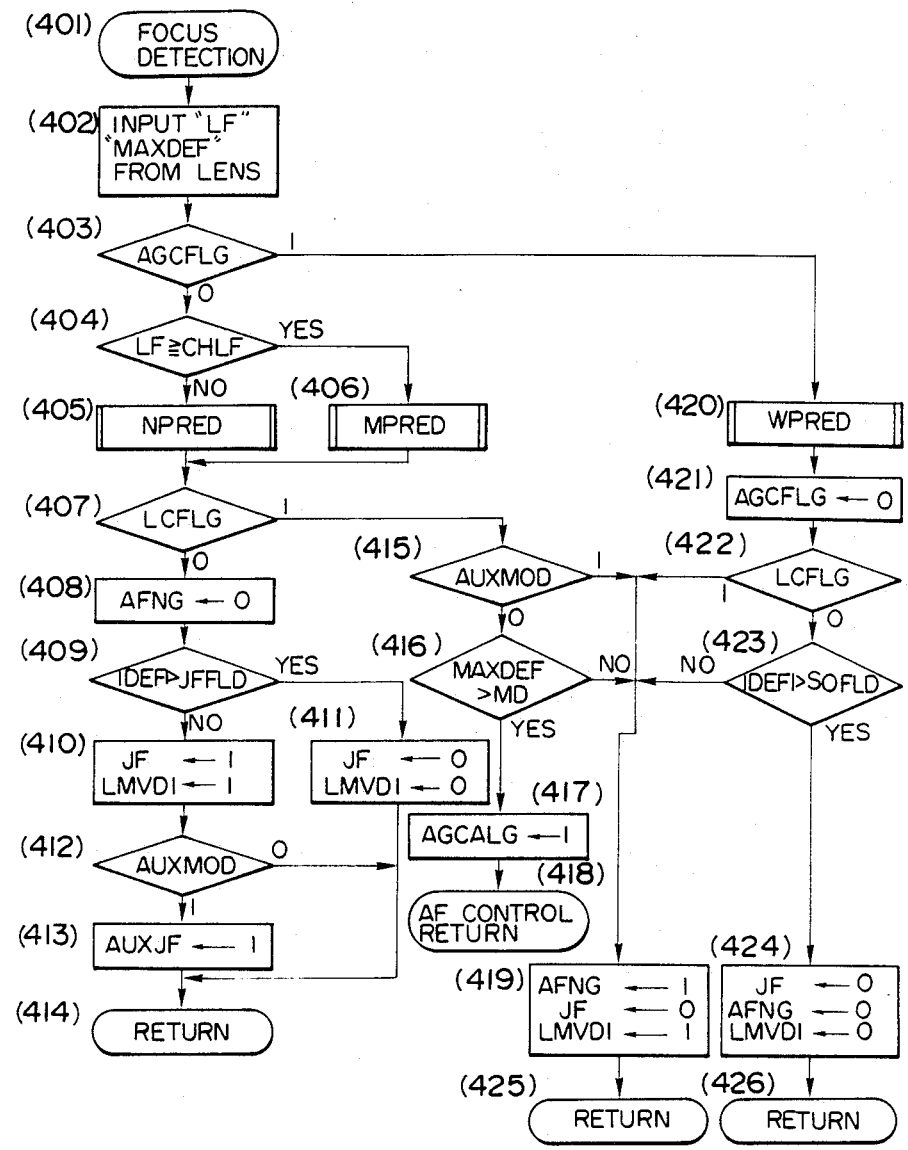

FIG. 9E is a flow chart of the "focus detection" subroutine. In this subroutine, a focal point of the photographing lens is detected from the image signal data stored in the RAM. If an in-focus state is detected, an in-focus flag JF is set at logic "1". However, if the object cannot be used to detect the focus state of the photographing lens due to a low contrast level of the object, a focus detection disable flag AFNG is set at logic "1". In these cases, a lens drive inhibit flag LMVDI is set at logic "1" to inhibit lens driving. The flow returns to the main routine. However, if the object contrast level is sufficiently high and an in-focus state cannot be obtained, a defocus amount is calculated. In this case, the flag LMVDI is kept at logic "0".

In the next step (115), a "display" subroutine is executed to display an in-focus or focus detection disable state. Predetermined data is sent to the display driver DDR to display the in-focus or focus detection disable state. This operation is not essential to the present invention, and a further description thereof will be omitted.

In step (116), a state of the flag LMVDI is detected. As described above, when the lens need not be driven, the flag LMMVDI is set at logic "1". If the flag LMVDI is set at logic "1" in step (116), the flow returns to the "AF control" subroutine in step (117). However, if the flag LMVDI is set at logic "0", the flow advances to step (118) and a lens drive subroutine "lens drive" is executed. This subroutine will be described later.

When the "lens drive" subroutine in step (118) is completed, the lens drive execution flag PRMV is set at logic "1" in step (119), and the flow returns to the "AF control" subroutine in step (120).

When the flow returns to the "AF control" subroutine, the operation in step (002) is restarted. AE and AF control subroutines are repeated as far as the switch SWI is turned on.

When the "AF control" subroutine in step (005) is called again (second time) in the main flow of FIG. 9A, state of the flag PRMV is detected in step (102).

When the in-focus or focus detection disable state is not detected in the previous "AF control" routine, the flag PRMV is not set at logic "1". The operations in step (106) and subsequent steps are repeated. When lens driving is performed in the previous cycle, the flag PRMV is set logic "1", and the flow advances to steP (103).

In step (103), the computer PRS communicates with the lens processor to detect a current state of the lens. When the end of predetermined driving designated in step (118) is signalled from the lens, the flag PRMV is set at logic "0" in step (105) and the operations in step (106) and subsequent steps are executed. The above detection is performed such that a monitor signal SENC is output from the encoder ENC during lens driving and that the signal SENC is detected by the computer PRS. However, when lens driving is not completed, i.e., when the monitor signal SENC is generated, the flow advances to step (104) and the flow returns to the "AF control" subroutine.

New focus detection operation and lens control operation are performed in the "AE control" subroutine only when the lens is not driven.

In the normal mode, as far as the switch SWI is ON, the AE and AF control subroutines are repeated. In the AF control subroutine, the defocus amount is detected on the basis of the image signal. If a low contrast level is detected, the focus detection disable state is displayed. However, if the in-focus state is detected, an in-focus display is performed. When a defocus amount is calculated in the out-of-focus state, the lens is driven be the defocus amount, and the in-focus state can be obtained.

An operation of auxiliary light will be described below.

When the object luminance level is low in the AF control subroutine, a flag LLFLG is set at logic "1" in the "image signal input" subroutine in step (108). A state of a flag LLFLG is detected in step (112), and the flow advances to step 121).

A state of an auxiliary protection unit AUT mounting member (not shown) is detected. If the unit AUT is not mounted on the member, the flow advances to step (113). The operations described above are repeated. Otherwise, the flow advances to step (122) and the auxiliary light mode flag AUXMOD is set at logic "1".

A state of a flag AUXUSE is detected in step (123). The flag AUXUSE is set at logic "1" when auxiliary light is actually protected while the "image signal input" subroutine in step (108) is executed (and the flag AUXMOD is set at logic "1"). In a state described above, the auxiliary light mode is set for the first time, and the auxiliary light is not projected before. The flow returns to the "AF control" subroutine in step 124). In this case, the image signal data input in step (108) is discarded without being used for focus detection. In the next "AF control" cycle, the image signal is input in the auxiliary light projection state and is used for focus detection.

When the "AF control" subroutine is called again after the flag AUXMOD is set at logic "1" in step (122), an image signal is input in the auxiliary light projection state in the "image signal input" subroutine in step (108). The state of the auxiliary light mode flag AUXMOD is detecred in step (111) and the flow advances to step (121). Meanwhile, when the auxiliary projection unit AUT is not detached from the mounting member, the flow advances to step (122). Otherwise, the flow advances to step (113) and the auxiliary light mode flag AUXMOD is set at logic "0", thereby canceling the auxiliary light mode. The flow returns to normal AF control.

A state of an auxiliary light use flag AUXUSE is detected in step (123) through steps (121) and (122). Since the "image signal input" subroutine is executed in step (108) in the auxiliary light projection state and the flag AUXUSE is set at logic "1", the flow advances to step (11 TM In step (114), the "focus detection" subroutine is executed. The subsequent operations are the same as those of the normal AF control subroutine.

The auxiliary light mode is set only when the object has a low luminance level and the auxiliary projection unit is attached to the mounting member. Focus control is performed on the basis of a detected image signal under auxiliary light. When an in-focus state is detected in the auxiliary light projection state, the auxiliary light in-focus flag AUXJF is set at logic "1" in the "focus detection" subroutine in step (114). In the flow of the "AF control" subroutine, a state of the flag AUXJF is detected in step (106), and the flow advances to step (107). The flow returns to the "AF control" subroutine in step (107). In other words, when the in-focus state is detected in the auxiliary light projection state, the focus control operation and the lens driving operation are not performed until the switch SWI is turned off.

FIG. 9C shows a flow chart of the "image signal input" subroutine.

A state of a flag AGCFLG is detected in step (202). The flag AGCFLG controls the AGC range on the sensor array and is cleared while the switch SW1 is kept off. The AGCFLG is set or reset in the "focus detection" subroutine during the ON state of the switch SW1. If the flag AGCFLG is set at logic "0", the flow advances to step (203) and the CAGC terminal of the computer PRS is set at "L" level. However, if the flag AGCFLG is set at logic "1", the flow advances to step (204) and the CAGC terminal of the computer PRS is set at "H" level. In other words, when the flag AGCFLG is set at logic "0", the center portion AGC range is selected. However, when the flag AGCFLG is set at logic "1", the total AGC range is selected.

In the first "AF control" subroutine cycle, the center portion AGC range is selected.

A state of the flag AUXMOD is detected in step (205). If the flag AUXMOD is set at logic "1"(i.e., the auxiliary light mode), the output SAL terminal of the computer PRS is set at "H" level to project the auxiliary light in s[ep (206). In step (207), the auxiliary light use flag AUXUSE is set at logic "1". If the flag AUXMOD is set at logic "0" (i.e., the normal light mode), the flow advances from step (205) to step (208). In this case, auxiliary light need not be projected.

In step (208), a light image is stored in the sensor unit SNS. More specifically, the computer PRS sets the signal CSDR at "H" level and sends a "storage start command" as the signal SO to the sensor driver SDR. The driver SDR receives this command and sets the clear signal CLR of the photoelectric transducer elements of the sensor unit SNS at "L" level, thereby initiating charge storage.

A storage time counter INTCNT set in the RAM is initialized to zero in step (209). In step (210), a 1-ms timer is reset and started. The 1-ms timer is a soft timer of the computer PRS.

A state of the input INTEND terminal of the computer PRS is detected in step (211) to determine whether storage is completed. The sensor driver SDR sets the signal INTEND at "L" level upon starting of storage. The driver SDR monitors the AGC signal SAGC from the unit SNS. When the signal SAGC reaches a predetermined level, the signal INTEND is set at logic "H", and at the same time, the charge transfer signal SH is set at "H" level for a predetermined period of time. The charge is transferred from the photoelectric transducer elements to the CCD section.

When the computer PRS detects the state of the INTEND terminal in srep (211) and the signal INTEND is set at "H" level, the flow advances to step (216) since the computer PRS detects the end of storage. However, if the signal INTEND is set at "L" level, the computer PRS determines that storage is not yet completed. In this case, the flow advances to step (212). The computer PRS determines in step (212) whether the time preset in the 1-ms timer has elapsed. If NO in step (212), the flow returns to step (211) and the computer PRS waits for the end of storage or the lapse of 1 ms. When 1 ms has elapseo before the end of storage, the flow advances to step (213). The storage time counter INTCNT is incremented by one in step (213), and the flow advances to step (214). The count of the counter INTCNT is compared with a predetermined constant MAXINT in step (214). MAXINT is a maximum storage time represented in ms. If the count of the counter INTCNT is smaller than MAXINT, the flow returns to step (210) and the computer PRS waits for the end of storage. However, if the count of the counter INTCNT coincides with MAXINT, the flow advances to step (215) and storage is forcibly ended. The forcible storage end is effected by sending te "storage end command" as the signal SO from the computer PRS to the sensor driver SDR. When the sensor driver SDR receives the "storage end command" from the computer PRS, the charge transfer signal SH is set at "H" level for a predetermined period of time to transfer the charge from the photoelectric transducer elements to the CCD section. Sensor storage is completed up to step (216) of the flow.

The output SAL terminal of the computer PRS is set at "L" level in step (216). If the SAL terminal is set at "H" level in step (206), auxiliary light is kept projected. The SAL terminal is set at "L" level to stop projecting the auxiliary light. In other words, the auxiliary light is projected during only sensor storage.

The count of the storage time counter INTCNT is compared with the predeter]mined constant AUXTINT in step (217). The constant AUXINT is a low luminance storage time expressed in correspondence with the storage time. If the count of the counter INTCNT is larger than the constant AUXINT, the flow advances to step (2I9) and the low luminance flag LLFLG is set at logic "1". However, if the count of the counter INTCNT is smaller than the [constant AUXINT, the flag LLFLG is cleared. When the storage time is longer than the predetermined period of time, the computer PRS detects the low luminance level.

The signal AOS obtained by amplifying the image signal OS from the sensor unit SNS through the sensor driver SDR is converted into digital signals, and the digital signals are stored in the RAM in step (220). More specifically, the driver SDR generates the CCD drive clocks φ1 and φ2 in synchronism with the clock CK from the computer PRS and supplies these clocks to the control circuit SSCNT in the unit SNS. The CCD section in the unit SNS is driven in response to the clocks φ1 and φ2. The charge in the CCD section is output as a serial signal OS as the image signal. This signal is amplified by an amplifier in the driver SDR and is supplied as a signa; AOS to the analog input terminal of the computer PRS The computer PRS performs A/D conversion in synchronism with the clock CK generated thereby. The resultant digital signals are sequentially stored at predetermined addresses of the RAM.

When the image signal input is ended as described above, the flow returns to the "image signal input" subroutine in step (221).

In the image signal input subroutine, storage time of the image signal is controlled. When the storage time is longer than the predetermined period of time, the flag LLFLG is set at logic "1". The flow is changed to the auxiliary light mode in the "AF control" subroutine. In the auxiliary light mode, image storage with auxiliary light projection is performed. The center portion AGC range or the total AGC range is selected in accordance with the state of the flag AGCFLG.

FIG. 9D is a flow chart of a "lens drive" subroutine.

When this subroutine is called, the computer PRS communicates with rhe lens processor in step (302) and receives two data "S" and "PHT" . Data "S" is a coefficient of the "defocus amount" to the "focus control lens extension amount" which is inherent to the photographing lens. In the single lens which can be integrally extended, since the photographing lens serves as a focus control lens, then S=1. However, in a zoom lens, the data S is changed depending on the zoom positions.

Data "PTH" represents an extension amount of the focal control lens per pulse from an encoder ENC interlocked with movement of the focal control lens. The encoder comprises a pulse disk for generating one pulse in synchronism with the unit of displacement of the lens.

A lens drive amount FP, i.e., a value converted to pulses of the encoder for counting an extension amount of the lens, is given in accordance with the current defocus amount DEF and the data S and PTH as follows:

$$FD = DEF \times S / PTH \qquad (1)$$

A pulse count FP representing a lens drive amount corresponding to a detected defocus amount DEF (to be described later) is calculated according to equation (1) in step (303).

The pulse count FP calculated in step (303) is output in step (304) to instruct driving of the focus control lens (when the lens comprises a single lens of an integral extension type, the lens is the entire photographing lens). The flow returns to the "lens drive" subroutine in step (305).

The data "S" and "PTH" are input to a memory in the lens processor ;PRS The signal CLCM is set at "H" level by the computer PRS. The signal SO as the data read command is supplied to the lens processor LPRS through the buffer LCM. The data "S" and "PTH" in the memory is input as the signals DLC and SI to the computer PRS, thereby reading the data.

The count data FP is sent as the signal SO to the lens processor LPRS. The lens processor LPRS sets one of the signals LMF and LMR at "H" level in response to the input FP to rotate the motor in a direction represented by the count data FP so as to set the lens in the in-focus state. In this case, the encoder SENC sends a pulse count corresponding to the displacment of the lens This coont data is counted by a counter in the lens processor LPRS When the count data representing the dispacement of the lens coincides with the count data input FP, the signal LMF or LMR is set at "L" level and the motor is stopped. Therefore, the lens is driven by a distance corresponding to the count data FP.

When the "lens drive" subroutine is called, the lens is driven by tne detected defocus amount and is moved to the in-focus position.

FIG. 9E is a flow chart of an "in-focus detection" subroutine

When this subroutine is called in the "AF control" subroutine in step (114), the computer PRS communicates with the lens processor LPRS to receive two data "LF" and "MAXDEF" from the lens in step (402). The data 37 LF" is focal distance data of the photographing lens. In a zoom lens, the data "LF" varies depending on the zoom positions. The daa "MAXDEF" is data representing a maximum defocus amount. In an infinite state of the photographing lens, when the object is set at a position corresponding to the nearest position of the lens, the data "MAXDEF" is given by distance-measuring this object. Therefore, the data "MAXDEF" represents the maximum defocus amount given at the time when the lens is attached to the camera body.

These data are stored in the memory of the lens processor LPRS. The principle of the maximum defocus amount is described in Japanese Patent Application No. 60-272563 filed by the present applicant. In general, the data MAXDEF represents a large value in a telephoto or zoom lens.

The state of the flag AGCFLG is detected in step (403). If this flag is set at logic "1", i.e., if the total AGC range is selected, the flow advances to step (420) and a defocus amount detection subroutine "WPRED" is executed.

If the flag AGCFLG is set at logic "0", i.e., if the center portion AGC range is selected, the flow advances to step (404). Since the switch SW1 is turned on and the "AF control" routine is executed for the first time, the flag AGCFLG is set at logic "0", and the operations in step (404) and subsequent steps will be described first.

The computer PRS compares focal length data LF with a constant CHLF in step (404). The constant CHLF represents a predetemmined focal length. If the focal length of the photographing lens exceeds the constant CHLF, the flow advances to step (406) and the defocus amount detection subroutine "MPRED" is executed. However, if the focal; length of the photographing lens is smaller than the constant, the flow advances to step (405) and a subroutine "NPRED" is executed.

Figure 8:
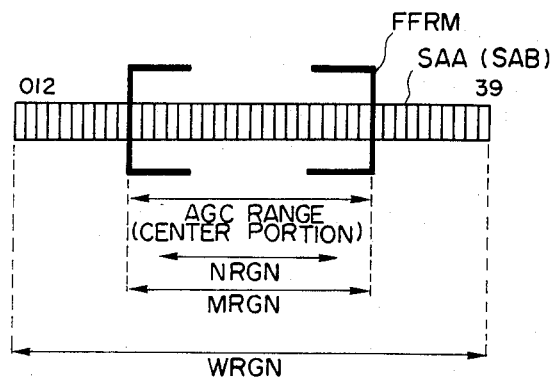
FIG. 8 is a view showing the positional relationship between the finder distance measuring frame and the sensor.

The subroutines "MPRED" and "NPRED" are defocus amount detection subroutines. However, when a defocus amount is detected from the image signal, the number of pixels subjected to calculations varies and the maximum defocus amount detected by the number of pixels also varies. FIG. 8 shows the relationship between the subroutine "WPRED37 , "MPRED", and "NPRED". The sensor array SAA (or SAB) is arranged with respect to a so-called distance measuring frame FFRM in the viewfinder.

The center portion AGC range is set to substantially equal to the distance measuring frame FFRM. The calculation areas (the defocus amounts are detected on the basis of the image signals within these areas) WRGN, MRGN, and NRGN are defined as shown in FIG. 8.

The subroutine "WPRED" is executed for the total AGC range, the subroutine "MPRED" is executed for the center portion AGC range, and the subroutine "NPRED" is executed for a range falling within the center portion AGC range. When the subroutin "WPRED" is executed, the total AGC range must be selected during charge storage. When the subroutine "MPRED" or "NPRED" is executed, the center portion AGC range must be selected.

Referring back to FIG. 9E, the subroutine will be described with reference to the flow chart.

The subroutine "NPRED" or "MPRED" is executed in step (405) or (406) in accordance with the focal length of the lens. A state of the flag LCFLG is detected in step (407). The flag LCFLG is a low contrast flag set in the focus amount detection subroutine "NPRED" or "MPRED". The flag LCFLG is set at logic "1" when the contrast value of the image signal within the detection calculation area is smaller than a predetermined value.

If the flag LCFG is set at logic "1" in step (407), the computer RS determines that the detected contrast level is sufficiently high and the flow advances to step (408). In step (408), a focus detection disable flag AFNG is cleared to logic "0". The absolute value or the defocus amount DEF detected in step (409) is compared with a predetermined constant JFFLD. The constant uFFLD represents the upper limit of the defocus amount which represents a marginal in-focus state. In other words, the constant JFFLD indicates an in-focus width. If the absolute value of the defocus amount is smaller than the constant JFFLD in step (409), the flow advances to step (410) and both the in-focus flag JF and a lens drive inhibit flag LMVDI are set at logic "1". However, if the absolute value of the defocus amount is larger than the constant JFFLD, the flow advances to step (411) and the flags JF and LMVDI are cleared. The flow returns to the "focus detection" subroutine in step (414). When an in-focus state is detected, the flow advances to step (412) and the state of the auxiliary light mode flag AUXMOD is detected. If the flag AUXMOD is set at logic "0", i.e., if the auxiliary light mode is not set, the flow returns to the "focus etection" subroutine in step (414). However, if the flag AUXMOD is set at logic "1", i.e., if the auxiliary light mode is set, the flow advances to step (4!3) and the auxiliary light in-focus flag AUXJF is set at logic "1". The subroutine returns to the main routine.

The operations in the focus detection subroutine are summarized as follows.

When the value representing the focal length is smaller than a predetermined value, the subroutine "NPRED" is executed to detect a defocus amount. Otherwise, the defocus amount is detected in the subroutine "MPRED". The subroutines "NPRED" and "MPRED" are executed when the flag AGCFLG is set at logic "0". As described in the image signal input subroutine, the signal CAGC is set at "L" level and the center portion AGC is selected. In this case, the operation is controlled by the center portion AGC range. AGC is performed on the basis of the pixel output corresponding to the defocus amount detection pixel range.

If the in-focus state is detected as the result of the defocus amount detection, the flag JFLMVDI is set at logic "1". When the flow returns to the "AF control" subroutine, the in-focus display is performed. When the in-focus st]te is detected in the auxiliary light mode, the flag AUXJF is set at logic "1". The subsequent image signal input focus detection and lens driving are inhibited. However, when the in-focus state is not detected, the flag LMVDI is set at logic "0", and the "lens drive" subroutine is executed when the "focus detection" subroutine is ended. Lens driving is performed in accordance with the defocus amount calculated in the subroutine "NPRED" or "MPRED".

When a low contrast level is detected in the subroutine "NPRED" or "MPRED" and the flag LCFLG is set at logic "1", the low contrast flag LCFLG is detected as logic "1" in the "focus detection" subroutine in step (407). The flow advances to step (415) and the state of the auxiliary mode flag AUXMOD is detected.

If the flag AUXMOD is set at logic "1", i.e., if the auxiliary light mode is set, the flow advances to step (419). However, if the flag AUXMOD is set at logic "0", i.e., if the auxiliary light mode is not set, the flow advances to step (416). In step (416), the maximum defocus amount MAXDEF is compared with a variable MD. The variable MD is set in the defocus detection subroutine ""MPRED" or "NPRED". The variable MD represents a maximum value of the defocus amount to be detected in each subroutine. Comparison between MAXDEF and MD in step (416) indicates that the defocus amount in the photographing lens currently attached to the camera body falls outside the possible detection range in each defocus amount detection subroutine. In other words, if MAXDEF ≦ MD, the defocus amount can be detected in the subroutine "MPRED" or "NPRED".

If MAXDEF ≦ MD in step (416), the flow advances to step (419) and focus detection is regarded to be impossible. In this case, the focus detection disable flag AFNG is set at logic "1" and the lens drive inhibit flag LMVDI is set at logic "1". The flow returns to the "focus detection" subroutine in step (425). In other words, the satisfactory defocus amount detection within the distance measuring range cannot be performed and the object has a low contrast level. The signal from the optimal distance measuring range is a low contrast signal. Therefore, the flags AFNG and LMVDI are set at logic "1", and the flow returns to the "AF control" subroutine. The focus detection disable state is displayed, and the "AF control" subroutine is executed again without driving the lens.

If MAXDEF >MD in step (416), the defocus amount cannot be detected within the relatively narrow distance measuring range in the subroutine "NPRED" or "MPRED". This also occurs in a lens such as a telephoto lens. If the optimal distance measuring range can be set for the specific lens attached to the camera body and focus detection is performed, a low contrast level can be eliminated. In this case, the flow advances to step (417) and the AGC range selection flag AGCFLG is set at logic "1" . The flow returns to the "AF control" subroutine in step (418). In other words, in this case, the in-focus state and the focus detection disable state are not discriminated. The defocus amount is detected in the subroutine "WPRED" in place of the subroutine "NPRED" or "MPRED" in the next "AF control" subroutine.

When the "AF control" subroutine is called again while the AGC range selection flag AGCFLG is set at logic "1", an image signal stored in the total AGC range is input in the "image signal input" subroutine executed prior to the "focus detection" subroutine. When the "focus detection" subroutine is called, the state of the flag AGCFLG is detected in step (403). In this case, the flow advances to step (420) and the defocus detection subroutine "WPRED" is executed. The subroutine "WPRED" has a relatively wide range of image signal as compared with the subroutine "NPRED" or "MPRED". Therefore, the defocus amount detected in the subroutine "WPRED" is accordingly large.

When execution of the subroutine "WPRED" is completed, the flag AGCFLG is cleared in step (421) so that the subroutine "NPRED" or "MPRED" is executed again in the next "AF control" subroutine.

The state of the low contrast flag LCFLG is detected in step (422). The low contrast flag LCFLG is set in the subroutine "WPRED" in step (420). If the flag LCFLG is set at logic "1", the object has a low contrast level. In this case, the flow advances to step (419) and the focus detection disable state is discriminated. The flow returns to the "focus detection" subroutine in step (425). If the flag LCFLG is set at logic "0" in step (422), the flow advances to step (423) and the absolute value of the defocus amount DEF is compared with a constant SDFLD. The constant SDFLD represents an upper limit of the defocus amount which represents a marginal in-focus state.

If $|DEF| > SDFLD$, the flow advances to step (424). The in-focus flag JF, the focus detection disable flag AFNG, and the lens drive inhibit flag LMVDI are cleared, and the flow returns to the "focus detection" subroutine in step (426). However, if $|DEF| > SDFLD$ is not satisfied in step (423), i.e., if a range close to the in-focus range is detected, the flow advances to step (419) in the same manner as a case wherein the flag LCFLG is set at logic "1" in step (422). The focus detection disable state is discriminated. Since the subroutine "WPRED" is executed when the low contrast state is detected as a result of defocus detection in the subroutine "NPRED" or "MPRED", it is assumed that the range close to the in-focus range represents detection of a defocus amount of the object outside the distance measuring frame FFRM shown in FIG. 8. When in-focus discrimination and lens driving are performed on the basis of this defocus amount, the object outside the distance measuring frame is set in the in-focus state. In order to prevent this, when the result in the subroutine "WPRED" indicates the range close to the in-focus range, the focus detection disable state is forcibly set.

The operations in the "focus detection" subroutine in FIG. 9E are summarized. In the normal state, the subroutine "NPRED" or "MPRED" is selected to perform defocus amount detection in accordance with the focal length of the lens. If a low contrast state is detected, the subroutine "WPRED" is executed in the next "AF control" subroutine only if the auxiliary light mode is not set and condition MAXDEF>MD is set. When the subroutine "NPRED" or "MPRED" is executed, charge storage is performed in the sensor array in the center portion AGC range. However, when the subroutine "WPRED" is executed, charge storage is performed in the total AGC range.

When the low contrast state is detected while the auxiliary light is used, focus detection is immediately performed in the subroutine "MPRED" or "NPRED" in the auxiliary light mode.

In the focus detection subroutine, the calculation area for the subroutine "NPRED" or "MPRED" is selected in accordance with the focal length. The center portion AGC range is selected and matched with the calculation area. If the low contrast state is not detected on the basis of the defocus amount of the image signal calculated in the center portion AGC range, lens driving and in-focus display are performed according to the detected defocus amount. However, if the low contrast state is detected, the focus detection disable state is displayed only when the defocus detection capacity in the calculation area is larger than the maximum defocus amount of the lens, i.e., if a sufficient defocus detection capacity is detected, and the detected defocus amount for the object within the distance measuring frame properly represents the defocus amount for the object.

If the defocus detection capacity is smaller than the maximum defocus amount of the lens, i.e., if the defocus detection capacity in the subroutine "NPRED" or "MPRED" is larger than the maximum defocus amount of the lens currently attached to the camera body and the low contrast state is not detected under the condition that focus amount detection is performed with the defocus detection capacity (the calculation area is increased) matching with the maximum defocus amount of the currently attached lens, the flag AGCFLG is set at logic "1". The calculation area is increased and the subroutine "WPRED" is executed. In this case, AGC is performed in the total AGC range so as to match the calculation area with the AGC range. When the low contrast state is detected in the subroutine "WPRED", the focus detection disable state is displayed. However, if the low contrast state is not detected and the defocus amount detected in the subroutine "WPRED" is large, lens driving is performed on the basis of the detected defocus amount. If the defocus amount represents the range close to the in-focus range, the object outside the distance measuring frame may be set in the in-focus state. In this case, the focus detection disable state is discriminated and displayed since the object of interest (i.e., the object falling within the distance measuring frame) is not set in the in-focus state.

In this manner, the AGC range can be matched with the calculation area and an optimal AGC operation can be always performed. The defocus amount can be accurately detected in the calculation area coinciding with the maximum defocus amount of the currently attached lens. At the same time, even when the calculation area is enlarged so as to fall outside the distance measuring frame, the object outside the distance measuring frame is not set in the in-focus state.

The calculation area can be automatically selected in accordance with object conditions, and optimal focus detection can be performed.

The calculation area corresponding to NRGN or MRNG is selected according to the focal length. If the focal length is short, NRGN is selected. Otherwise, MRGN is selected. Therefore, image processing in the calculation area corresponding to the focal length can be performed and optimal focus detection can be achieved.

Figure 9F:
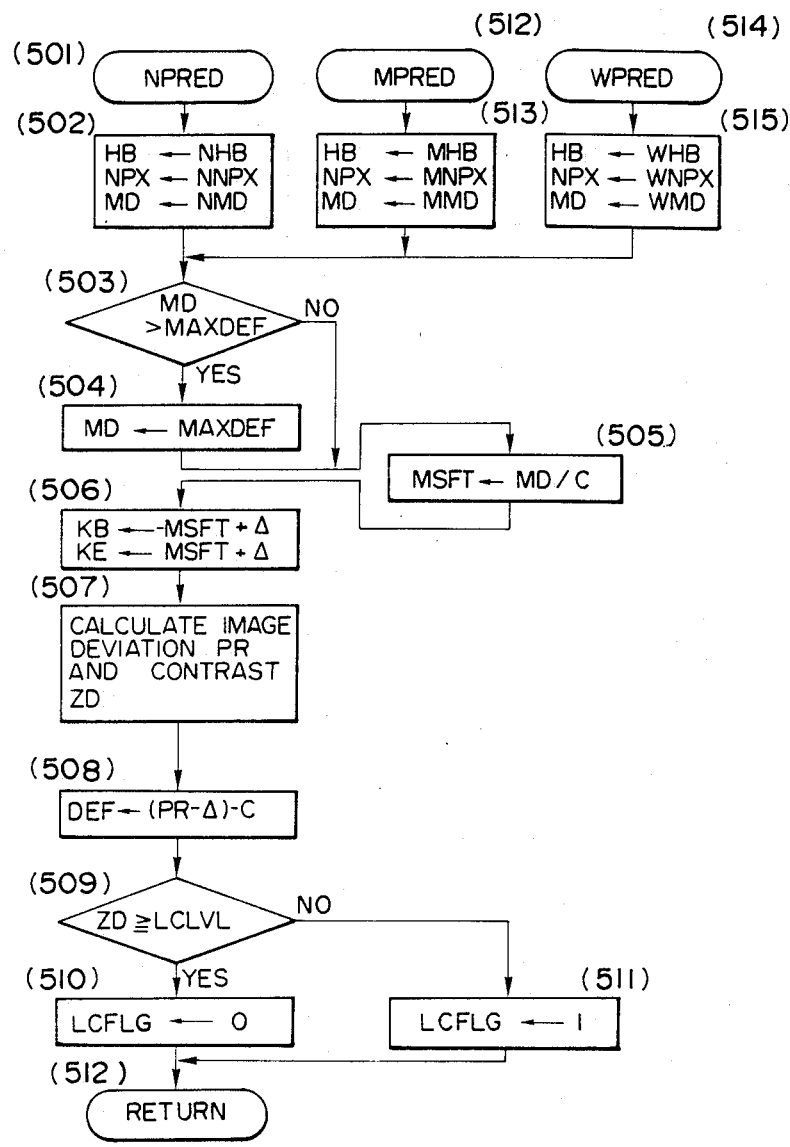

FIG. 9F is a flow chart of the three defocus amount detection subroutines "NPRED", "MPRED", and "WPRED". Each subroutine aims at detecting a deviation between two images by using a given image signal and calculating a defocus amount. A detailed technique is disclosed in Japanese Patent Application No. 61-160824 filed by the same applicant, and a detailed description thereof will be omitted. Each subroutine is based on a basic algorithm as follows:

$$X(K) = \sum_{I=0}^{M-0} f\{A(HB + I), B(HB + I + |K| + 1)\} -$$

$$f\{A(HB + I + 1), B(HB + I|K|)\} \quad (K < 0)$$

$$= \sum_{I=0}^{M-1} f\{A(HB + I + K), B(HB + I + 1)\} -$$

$$f\{A(HB + I + K + 1), B(HB + I)\} \quad (K \geq 0)$$

$$(KB \leq K \leq KE, M = NPX - |K| - 1) \quad (2)$$

where A(I) and B(I) are two image signals, f{} is a function of max{a,b}, or min{a,b}, in which the function max {a,b} indicates that a larger one of a and b is extracted, and the function min{a,b} indicates that a smaller one of a and b is extracted.

X(K) is the specific calculation range of the image signal. Different specific ranges are used in the subroutines "NPRED", "MPRED", and "WPRED". The specific range is defined by variables HB and NPX in equation (2). Referring to FIG. 9F, in the "focus detection" subroutine, when the defocus amount detection subroutine "NPRED" is called, a constant NHB is set in a variable area HB set in the RAM in the computer PRS and a constant NNPX is stored in the variable area HB therein in step (502). When the subroutine "MPRED" is called, constants MHB and MNPX are respectively set in the variable areas HB and NPX in step (513). When the subroutine "WPRED" is called, constants WHB and WNPX are stored in step (515). The above operation will be described in detail with reference to FIG. 8. NRGN, MRGN, and WRGN are calculation areas for the subroutines "NPRED", "MPRED", and "WPRED", respectively. The number of pixels on the sensor array is 40, and the pixels are numbered "0", "1",... "39". The calculation area NRGN for the subroutine "NPRED" corresponds to pixel Nos. 12 to 27. Constants are given as NHB=12 and NNPX=16. Similarly, the calculation area MRGN for the subroutine "MPRED" corresponds to the range of pixel Nos. 10 to 29, so that constants are given as MHB=10 and MNPX=20. The calculation area WRGN for the subroutine WPRED corresponds to the range of pixel Nos. 0 to 39, so that the constants are given as WHB=0 and WNPX=40.

In steps (502), (503), and (504), a variable MD is set in addition to the variables HB and NPX. The variable MD represents the maximum detection defocus amount in each defocus amount detection subroutine. The role of the variable MD will be described below.

The calculation according to equation (2) aims at detecting a deviation between the two images in the range of KB≦K≦KE. When the absolute value of K is increased, the number M of pixels for calculating an evaluation amount X(K) (where K is a variable) is decreased according to equation (2) (M=NPX−|K|−1).

When the value of M is excessively decreased upon an increase in the absolute value |K|, the corresponding S/N ratio of the evaluation amount X(K) is decreased. In order to assure calculation precision depending on the number M of pixels, the upper limit of the absolute value |K| must be defined in accordance with the number NPX of pixels. When NPX is increased, the upper limit of |K| must also be increased. This allows a proper calculation even if the deviation between the two images is increased. Therefore, the defocus amount detection capacity can be increased.

Constants NMD, MMD, and WMD in steps (502), (513), and (515) are defocus amount equivalent values obtained by the upper limits of |K| allowed from NPX in the respective subroutines.

The lower limit of the number M of pixels cannot be solely determined since it is associated with the S/N ratio of the focus detection system and required precision. However, since the number of pixels of the sensor array in this embodiment is given as 40, assume that the lower limit of M is defined as 10. The upper limit of the absolute value |K| is then given according to equation M=NPX−|K|−1 as follows. The upper limit of |K| in the subroutine "NPRED" is 5 (=16−10−1); the upper limit in the "MPRED", 9 (=20−10−1); and the upper limit in the "WPRED", 29 (=40−10−1). When a constant C for converting the image deviation between the two images into the defocus amount is multiplied with each upper limit calculated above, the maximum detection defocus amount in each subroutine can be calculated. The constant C is a value determined in accordance with a focus detection secondary optical system. If C=2, then the maximum detection defocus amount NMD in the subroutine "NPRED" is 10 (=5×2); MMD, 18 (=9×2); and WMD, 54 (=29×2).

Referring back to the flow chart of FIG. 9(f), the variable MD is compared with the variable MAXDEF in step (503). The above values are stored in the corresponding variable MD areas, and the variable MAXDEF is stored in the variable MAXDEF area in the first step in the "focus detection" subroutine which detects the maximum defocus amount of the photographing lens attached to the lens.

If MD>MAXDEF, then the flow advances to step (504). However, if MD>MAXDEF, then the flow advances to step (505).

The value of the variable MAXDEF is stored again in the variable MD area in step (504), and the flow advances to step (505). In step (505), the variable MD is divided by the constant C to obtain a variable MSFT. The variable MSFT represents the upper limit of the absolute value |K|.

The variable MD is compared with the variable MAXDEF in step (503) due to the following reason. If the maximum defocus amount of the lens attached to the camera body is smaller than the maximum detection defocus amount in the defocus amount detection subroutine, the variable MSFT need not be calculated from the variable MD. In this case, a smaller value is used. Therefore, if MD>MAXDEF, the value of the variable MAXDEF is stored again in the variable MD area in step (504).

The lower and upper limits KB and KE of K in equation (2) are calculated in step (506) as follows:

$$KB = -MSFT - \Delta$$

$$KE = MSFT + \Delta \quad (3)$$

In equations (3), the constant $\Delta$ is added to each of the lower and upper limits KB and KE. The constant $\Delta$ is the deviation between the two images in the in-focus state and serves as an offset value when the lower and upper limits KB and KE are set in accordance with the maximum defocus amount of the lens.

An image deviation amount PR and a contrast amount ZD are obtained according to a method disclosed in Japanese Patent Application No. 61-160824 and based on equation (2) in step (507).

In step (508), the defocus amount is calculated on the basis of the image deviation PR obtained in step (507):

$$DEF = (PR - \Delta) \cdot C \quad (4)$$

The image deviation $\Delta$ in the in-focus state is subtracted from the image deviation PR, and the coefficient C in the image deviation vs. defocus amount curve is multiplied with the difference, thereby obtaining the defocus amount ADEF.

In step (509), the contrast amount ZD obtained in step (507) is compared with a constant LCLVL. The constant LCLVL is a lower limit of the contrast value which allows correct in-focus detection. If $ZD \geq LCLVL$, the contrast value is sufficiently high. In step (510), the low contrast flag LCFLG is cleared to logic "0". However, if $ZD < LCLVL$, the contrast value is not sufficiently high. In step (511), the low contrast flag LCFLG is set to logic "1". Defocus amount detection is completed up to this step. In step (512), the flow returns to the defocus amount detection subroutine "NPRED", "MPRED", or "WPRED".

Since the subroutines "NPRED", "MPRED", and "WPRED" have the sequences as described above, the defocus amount detection operations are performed according to the image deviations in the corresponding calculation areas. The corresponding operations are performed on the basis of the defocus amounts in the corresponding steps.

Since the deviation $\Delta$ is taken into consideration in the above operations and offset processing is performed, the correct image deviation can always be detected.

In the above embodiment, the AGC sensor is arranged near the image signal sensor array. However, the AGC sensor need not be arranged. The present invention is also applicable to a sensor unit in which the image signal is output as an AGC signal.

In the above embodiment, sensor charge storage is performed first in the center portion AGC range. When a telephoto photographing lens is attached to the camera body and a low contrast state is detected, the center AGC range is switched to the total AGC range and the charge is stored again. For this reason, the storage and calculation times are prolonged by the second storage and calculation cycle, and the response time is undesirably prolonged. In order to prevent this, the storage and calculation are performed in the total AGC range. If the range close to the in-focus range is detected, storage and calculation are repeated in the center portion AGC range. In this case, the sensor output range used in the calculations must be matched with the AGC range.

According to the present invention as described above, a plurality of AGC ranges of the focus detection sensor array are prepared. If focus detection cannot be performed, the sensor output range for processing and the optimal sensor AGC range are changed. Sensor charge storage and focus detection are performed again, thereby achieving correct focus detection.

What is claimed is:

1. A focus detection apparatus comprising:
   (a) a sensor section, having a plurality of pixels, for receiving light incident through an optical system and storing an image signal corresponding to the received light;
   (b) a storage time control circuit for controlling storage time of an image signal on the basis of an output from said sensor section such that a stored image signal has a predetermined level;
   (c) a focus detector for detecting a focus state on the basis of outputs from the pixels of said sensor section; and
   (d) a sensor section switching circuit for determining an operation range of said sensor section in accordance with a detection operation result of said focus detector, and for allowing the focus state detection operation of said focus detector and storage time control on the basis of the determined operation range.

2. An apparatus according to claim 1, wherein said sensor section comprises a first sensor array including the plurality of pixels and a second sensor array having a plurality of light-receiving elements, and wherein said focus detector performs the focus state detection operation on the basis of an output from said first sensor array, and wherein said storage time control circuit performs the storage time control on the basis of an output from said second sensor array.

3. An apparatus according to claim 2, wherein said first and second sensor arrays are aligned with each other and receive identical images.

4. An apparatus according to claim 1, wherein said switching circuit is operated and widens the operation range of the sensor section when the focus state detection operation result shows a focus detection disable state.

5. An apparatus according to claim 4, wherein said focus detector detects a defocus amount and a contrast state on the basis of the outputs from the pixels and sets the focus detection disable state when a detected contrast state has a level lower than the predetermined level.

6. An apparatus according to claim 4, further comprising a discriminator for discriminating the focus detection disable state when the defocus amount calculated by the focus state detection operation of the focus detector is smaller than a predetermined value after the operation range is widened.

7. An apparatus according to claim 1, further comprising inhibiting means for inhibiting the operation of the switching circuit when the focus state detection operation is performed such that an object is illuminated by an auxiliary light source.

8. An apparatus according to claim 4, wherein said optical system is a focusing optical system, and wherein said switching circuit compares a maximum defocus amount of said focusing optical system with a defocus detection capacity of the operation range before a widening of the operation range and widens the operation range when the maximum defocus amount of the focusing optical system is larger than the defocus detection capacity.

9. An apparatus according to claim 4, wherein said optical system is a focusing optical system, and wherein said focus detector performs a contrast state detection operation on the basis of the outputs from the pixels and a comparison between a maximum defocus amount and a defocus detection capacity in an operation range before a widening of the operation range, said focus detector being arranged to widen the operation range when the contrast state has a level lower than the predetermined level and the maximum defocus amount of the focusing optical system is larger than the defocus detection capacity.

10. A focus detection apparatus comprising:
(a) a sensor section, having a plurality of pixels, for receiving light incident through an optical system and storing an image signal corresponding to the received light;
(b) a storage time control circuit for controlling storage time of an image signal on the basis of an output from said sensor section such that a stored image signal has a predetermined level;
(c) a focus detector for detecting a defocus amount and a contrast state on the basis of outputs from the pixels of said sensor section; and
(d) a switching circuit for widening an operation range of said sensor section, and for causing said focus detector to detect the defocus amount, and for performing storage time control when the contrast state has a level lower than a predetermined level.

11. A focus detection apparatus according to claim 10, wherein said optical system is a focusing optical system, and wherein said switching circuit operates when a maximum defocus amount of the focusing optical system is larger than a defocus detection capacity of the operation range.

12. A focus detection apparatus according to claim 10 wherein said focus detector detects a defocus amount and sets the focus detection disable state when a detected contrast state has a level lower than the predetermined level.

13. A focus detection apparatus comprising:
(a) a sensor section, having a plurality of pixels, for receiving light incident through an optical system and storing an image signal corresponding to the received light;
(b) a focus detector for detecting a focus state on the basis of outputs from the pixels of said sensor section; and
(c) a range changing circuit for widening an operation range of said sensor section when the focus detection operation shows a focus detection disable state, and for performing the focus state detection operation on the basis of outputs from the widened operation range, said range changing circuit narrowing the operation range in a next focus detection operation which is performed on the basis of the narrowed operation range.

14. An apparatus according to claim 13, wherein said optical system is a focusing optical system, and wherein said range changing circuit compares a maximum defocus amount of said focusing optical system with a defocus detection capacity of the operation range before a widening of the operation range and widens the operation range when the maximum defocus amount of the focusing optical system is larger than the defocus detection capacity.

15. A focus detection apparatus comprising:
a sensor section, having a plurality of pixels, for receiving light incident through a focusing optical system, and for storing an image signal corresponding to the received light;
a focus detector for detecting a focused state on the basis of outputs from the pixels of said sensor section, said focus detector performing a contrast state detection on the basis of the outputs from the pixels and a comparison between a maximum defocus amount and a defocus detection capacity in an operation range before a widening of the operation range, said focus detector being arranged to widen the operation range when the contrast state has a level lower than a predetermined level and the maximum defocus amount of the focusing optical system is larger than the defocus detection capacity; and
a switching circuit for changing an operation range of said sensor section, and for causing said focus detector to perform the focus state detection operation on the basis of outputs from a changed operation range when the focus state detection operation represents a focus detection disable state.

16. A focus detection apparatus comprising:
sensor means, having a plurality of pixels, for receiving light incident through a focusing optical system, and for storing an image signal corresponding to the received light;
focus detector means for detecting a focus state on the basis of outputs from the pixels of said sensor means; and
switching means for changing an operation range of said sensor means, and for causing said focus detector means to perform the focusing state detection operation on the basis of outputs from the changed operation range when a maximum defocus amount of the imaging optical system is larger than a defocus detection capacity of the operation range.

17. A focus detection apparatus comprising:
sensor means, having a plurality of pixels, for receiving light incident through an optical system and for storing an image signal corresponding to the received light;
focus detector means for detecting a focus state on the basis of outputs from the pixels of said sensor means; and
changing means for changing an operation range of said sensor means when the focus detection is disabled and for causing the focus detection operation to be performed on the basis of outputs from the changed operation range, said changing means being in an inoperable state in an auxiliary light mode, the focus detection operation being performed in the auxiliary light mode on the basis of outputs from the operation range under projection of an auxiliary light without changing the operation range.

18. A focus detection apparatus comprising:
(a) a sensor section, having a plurality of pixels, for receiving light incident through an optical system and storing an image signal corresponding to the received light;
(b) a storage time control circuit for controlling storage time of an image signal on the basis of an output from said sensor section such that a stored image signal has a predetermined level;

(c) a focus detector for detecting a focus state on the basis of an output from the pixels of said sensor section;

(d) a sensor section switching circuit for changing an operation range of the sensor section, said detector and storage time control circuit performing the detection operation and the time control operation in accordance with an output from the operation range selected by said switching circuit.

19. A focus detection apparatus comprising:

(a) a first sensor array, having a plurality of pixels, for receiving light from an object and storing an image signal corresponding to the received light;

(b) a second sensor array, having a plurality of light receiving elements, for receiving light from the object;

(c) a focus detector for detecting a focus state of the object on the basis of outputs from the pixels of said first sensor array;

(d) a storage time control circuit for controlling storage time of said image signal on the basis of an output from said second sensor array; and (e) a sensor section switching circuit for changing an operation range of said first sensor array, said switching circuit changing an operation range of said second sensor array in accordance with the changing of the operation range of said first sensor array.

* * * * *

UNITED STATES PATENT AND TRADEMARK OFFICE
CERTIFICATE OF CORRECTION

PATENT NO. : 4,952,963
DATED : August 28, 1990
INVENTOR(S) : Akira Akashi

It is certified that error appears in the above-identified patent and that said Letters Patent is hereby corrected as shown below: ON THE TITLE PAGE:

[54]   In the title:

"FOCUS DETECTION APPARATUS FOR CAMERA" should read
--FOCUS DETECTION APPARATUS FOR A CAMERA--.

FIG. 9B   (Sheet 8 of 11):

In box "(121)", "AWXILIARY" should read --AUXILIARY--.

COLUMN 1:

Line 2, "FOCUS DETECTION APPARATUS FOR CAMERA" should read --FOCUS DETECTION APPARATUS FOR A CAMERA--.

Line 36, "detection, is" should read --detection is--.

Line 38, "measurementexists" should read --measurement exists--.

COLUMN 2:

Line 20, "photoelect" should read --photoelectric--.

Line 22, "showning" should read --showing--.

Line 24, "and shows is" should read --and shows--.

Line 62, "lens I,NS" should read --lens LNS--.

UNITED STATES PATENT AND TRADEMARK OFFICE
CERTIFICATE OF CORRECTION

PATENT NO. : 4,952,963

DATED : August 28, 1990

INVENTOR(S) : Akira Akashi

It is certified that error appears in the above-identified patent and that said Letters Patent is hereby corrected as shown below:

COLUMN 4:

Line 7, "ahd" should read --and--.

Line 15, "tech-=ique" should read --technique--.

Line 18, "a-paratus" should read --apparatus--.

Line 27, "film winging" should read --film winding--.

Line 41, "lens drive voltage V" should read --lens drive voltage VL--.

Line 48, "lo" should read --to--.

COLUMN 5:

Line 28, "SW2; and" should read --SW2) and--.

Line 67, "focus control motor MTR" should read --focus control motor LMTR--.

COLUMN 6:

Line 32, "switch SW12" should read --switch SW1--.

Line 46, "inventioh" should read --invention--.

COLUMN 7:

Line 55, "flag LMMVDI" should read --flag LMVDI--.

UNITED STATES PATENT AND TRADEMARK OFFICE
CERTIFICATE OF CORRECTION

PATENT NO. : 4,952,963

DATED : August 28, 1990

INVENTOR(S) : Akira Akashi

It is certified that error appears in the above-identified patent and that said Letters Patent is hereby corrected as shown below:

COLUMN 8:

Line 9, "steP" should read --step--.

Line 44, "auxiliary protection unit AUT" should read --auxiliary projection unit AUT--.

Line 52, "protected" should read --projected--.

Line 68, "detecred" should read --detected--.

COLUMN 9:

Line 13, "step (11 TM In" should read --step (114). In--.

Line 36, "The AGCFLG" should read --The flag AGCFLG--.

Line 54, "s[ep (206)." should read --step (206).--.

COLUMN 10:

Line 25, "elapseo" should read --elapsed--.

Line 37, "te" should read --the--.

Line 53, "predeter]mined" should read --predetermined--.

Line 54, "TINT" should read --INT--.

Line 60, "[constant" should read --constant--.

UNITED STATES PATENT AND TRADEMARK OFFICE
CERTIFICATE OF CORRECTION

PATENT NO. : 4,952,963

DATED : August 28, 1990

INVENTOR(S) : Akira Akashi

It is certified that error appears in the above-identified patent and that said Letters Patent is hereby corrected as shown below:

COLUMN 11:

Line 8, "signa; AOS" should read --signal AOS--.

Line 9, "PRS The" should read --PRS. The--.

Line 26, "rhe" should read --the--.

Line 27, "PHT" should read --PTH--.

Line 46, "FD=DEFXS/PTH   (1)" should read
           --FP=DEFXS/PTH   (1)--.

Line 59, "lens processor; PRS The" should read
           --lens processor LPRS. The--.

COLUMN 12:

Line 4, "lens This coont" should read --lens. This count--.

Line 5, "LPRS When" should read --LPRS. When--.

Line 11, "tne" should read --the--.

Line 14, "subroutine" should read --subroutine.--.

Line 19, " data 37 LF" " should read --data "LF"--.

Line 21, "daa "MAXDEF" should read --data "MAXDEF"--.

Line 50, "predetemmined" should read --predetermined--.

UNITED STATES PATENT AND TRADEMARK OFFICE
CERTIFICATE OF CORRECTION

PATENT NO. : 4,952,963

DATED : August 28, 1990

INVENTOR(S) : Akira Akashi

It is certified that error appears in the above-identified patent and that said Letters Patent is hereby corrected as shown below:

COLUMN 12 cont'd.:

Line 54, "focal;" should read --focal--.

Line 65, "subroutine "WPRED37 , " should read --subroutines "WPRED", --.

COLUMN 13:

Line 11, "subroutin" should read --subroutine--.

Line 22, "focus" should read --defocus--.

Line 29, "high" should read --high,--.

Line 31, "value or" should read --value of--.

Line 34, "uFFLD" should read --JFFLD--.

Line 49, "focus etection" should read --focus detection--.

COLUMN 14:

Line 5, "st]te" should read --state--.

Line 27, " ""MPRED " should read --"MPRED"--.

Line 65, "discrimated." should read --discriminated.--.

COLUMN 16:

Line 58, "MRNG" should read --MRGN--.

UNITED STATES PATENT AND TRADEMARK OFFICE
CERTIFICATE OF CORRECTION

PATENT NO. : 4,952,963

DATED : August 28, 1990

INVENTOR(S) : Akira Akashi

It is certified that error appears in the above-identified patent and that said Letters Patent is hereby corrected as shown below:

COLUMN 18:

Line 38, "WMD, 54(=29X2)." should read
--WMD, 58(=29X2).--.

Line 39, "FIG. 9(f)," should read --FIG. 9F,--.

Line 48, "MD>MAXDEF," should read --MD$\leq$maxdef,--.

COLUMN 19:

Line 2, "KB=-MSFT-  " should read --KB=-MSFT+  --.

COLUMN 21:

Line 39, "claim 10" should read --claim 10,--.

COLUMN 22:

Line 45, "system and" should read --system, and--.

Signed and Sealed this

Twelfth Day of January, 1993

Attest:

DOUGLAS B. COMER

Attesting Officer

Acting Commissioner of Patents and Trademarks